L. B. TEBBETTS, 2D.
COMPOSITE METAL.
APPLICATION FILED SEPT. 23, 1912.
1,101,219.
Patented June 23, 1914.
Fig. I.
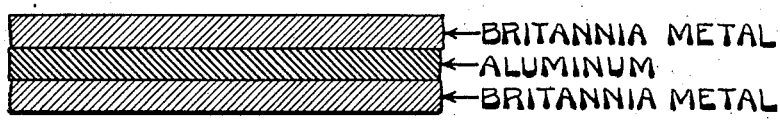
Fig. II.
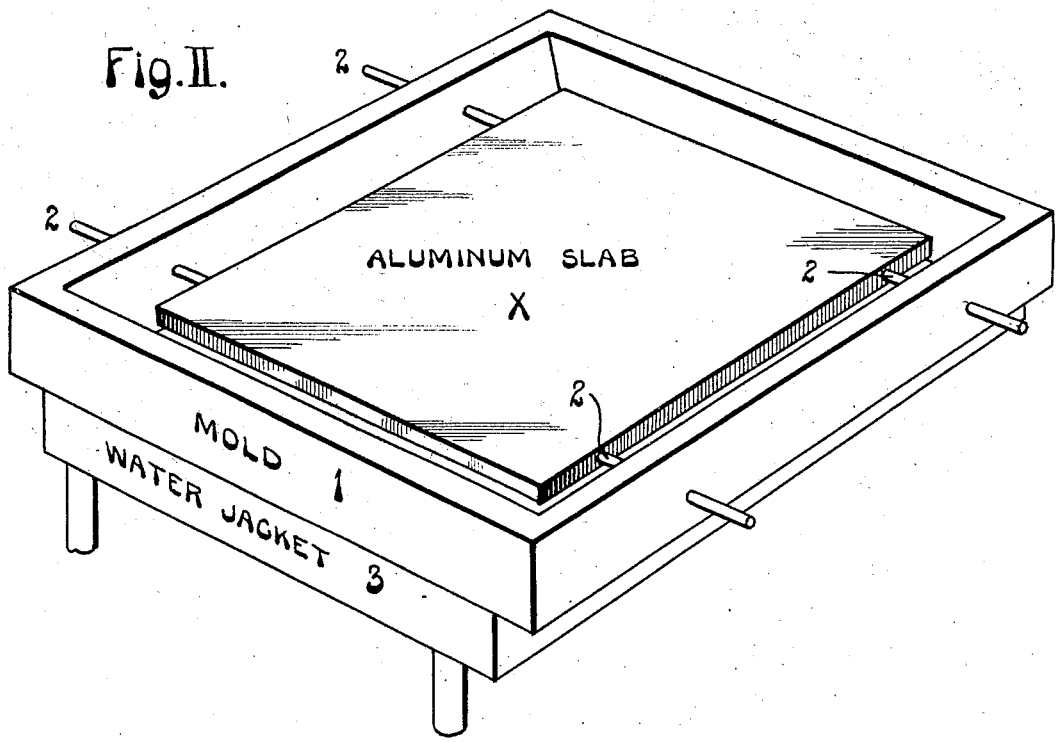
Attest
a. J. McCauley
E. B. Perry
Inventor:
L. B. Tebbetts, 2ND,
by Knight & Cook
Att'ys.

UNITED STATES PATENT OFFICE.

LEWIS B. TEBBETTS, 2d, OF ST. LOUIS, MISSOURI.

COMPOSITE METAL.

1,101,219.  Specification of Letters Patent.  Patented June 23, 1914.

Application filed September 23, 1912. Serial No. 721,820.

*To all whom it may concern:*

Be it known that I, LEWIS B. TEBBETTS, 2d, a citizen of the United States of America, and a resident of the city of St. Louis and State of Missouri, have invented certain new and useful Improvements in Composite Metal, of which the following is a full, clear, and exact description, reference being had to the accompanying drawings, forming a part of this specification.

My invention relates to a composite metal suitable for use in the manufacture of inexpensive toilet ware, such as brush backs, pensive toilet ware, such as brush backs, hand mirror frames, and the like, and other articles of merchandise commonly made of Britannia metal.

The invention has for its object the production of a composite metal that may be used in lieu of Britannia metal as ordinarily made, and which has incident thereto, advantages as compared to Britannia metal, comprising cheapness, lightness, strength, rigidity and elasticity.

In the drawings: Figure I is a cross section, illustrating my composite metal. Fig. II is a perspective view, showing the mold utilized in producing ingots of my composite metal.

My composite metal includes two outer layers of Britannia metal, and an intermediate layer, or core layer, of aluminum, the core layer of aluminum being preferably approximately pure; so that it contains little, if any, foreign substance. The two outer layers of Britannia metal, with the aluminum core between them, are permanently joined to each other, thereby producing a multiple-ply structure, in which each of the layers of Britannia metal serves as a face, while the layer of aluminum between them affords a backing for each facing layer.

The Britannia metal preferably used in making my composite metal comprises from 88% to 96% tin, from 4% to 9% antimony, 1% to 4% copper.

As is well known, Britannia metal, while being a highly satisfactory metal for use in the manufacture of various commodities commonly made therefrom, is a heavy product, insufficient in strength, and lacks rigidity and elasticity. By combining with Britannia metal an intermediate core of aluminum, I produce a composite metal that is highly serviceable in lieu of plain Britannia metal, and which has marked merits over such plain Britannia metal by reason of its lightness, strength, rigidity, and elasticity resulting from the employment of the aluminum; and, furthermore, a less expensive product, for the reason that the quantity of aluminum used in the core of the composite metal is not as costly as the same quantity of Britannia metal would be. It should be further noted that the ductility of Britannia metal is not impaired by the use of approximately pure aluminum in combination with Britannia metal as a layer of a composite body; consequently, such composite body may be pressed in dies, or otherwise treated, with the same degree of efficiency as Britannia metal.

To produce a commercial composite metal, made up of individual layers, including an inner layer of aluminum or aluminum alloy, and outer layers of Britannia metal, and in which the layers are permanently united, without the different metals in the adjoining layers being alloyed with each other, to the great detriment of the product, it is essential that the layers be joined by the process I will proceed to set forth.

I first produce a slab X of aluminum, which is rolled to a desired thickness. This slab is introduced into a mold and suitably supported therein, for example, in the manner illustrated in Fig. II, in which the slab is shown supported by pins 2 mounted in the walls of the mold 1. These pins, or any substitute therefor, are utilized to so support the slab X that it will be free of contact with the bottom of the mold and the mold walls. The slab having been properly placed in the mold, I next pour molten Britannia metal into such mold for the production of the outer layers of my composite metal. This molten Britannia metal is sufficient in quantity to inclose the aluminum slab and, when the molten metal becomes cooled, there is present in the mold an ingot comprising an outer incasing body of the Britannia metal and an inner core or core body of aluminum. Cooling of the ingot in the mold is preferably facilitated by circulating water through the water jacket 3. The ingot of metal comprising an aluminum core and outer casing of Britannia metal is then taken from the mold and, having been scraped and brushed, is rolled in a rolling mill until the metal has been reduced to a desired thickness, say, about one-fifth of the original thickness of the ingot, the initial rolling operation being one involving severe and rapid pressure by the rolls. When the ingot has been rolled to the degree mentioned, it is in a condition that may be termed "broken down" and, thereafter, the slab that has been produced by the initial rolling may be rolled to any necessary further degree by passing it between the rollers the same as in rolling a slab or sheet composed of only a single layer of metal.

I desire to here state that I am aware efforts have heretofore been made to produce composite metal articles in which metals softer than aluminum have been fused to such aluminum; but, in so far as I am aware, all of these efforts have involved the carrying out of a method that resulted in the aluminum being alloyed with the metal fused thereto, as distinguished from my composite metal in which the aluminum is so united to the metal as to avoid fusing of the two metals, thus providing for each retaining its original identity and merits. If the elements of a composite metal article such as enter into my composite metal are combined by following the steps heretofore proposed to be followed, the outer metals are deteriorated in nature to such a degree as to render the product of little commercial value as compared with the commercial value of my composite metal article for the use intended. When a composite metal such as herein described is so produced as to result in an alloy of the outer soft metal and the aluminum in the intermediate layer, the number of layers of metal are increased by the presence of two layers of alloy at opposite sides of the layer of aluminum. Therefore, inasmuch as alloys of tin and aluminum are useless in the arts, the product is depreciated in a degree proportionate to the existence of such alloys therein. The presence of such alloys detracts greatly from the utility of the composite metals for the reason that the metals cannot be properly worked in various operations necessary to manufacturers, such as spinning, drawing and stamping. This is due to the alloys weakening the composite metal and rendering it only of such strength as is indicated by its weakest part, viz., that comprising the alloy.

It is well to add in conclusion that the highly desirable characteristic of my composite metal article, namely: the feature of the aluminum and soft metal layers of the metal being unalloyed with each other, is derived by reason of the aluminum, or aluminum alloy core, being in an unmolten state when the soft metals are placed therearound in a suitable mold, thereby causing the molten soft metals being chilled by the mold during the molding operation, without opportunity for the alloying of the aluminum with the soft metals. The subsequent operations of rolling the cast ingot result in the unalloyed metals being caused to cohere to each other; consequently, when all of the steps necessary to the production of my metal have been carried out, a metal article is acquired in which the outer soft metals and the aluminum core are present in unalloyed condition, and each metal is susceptible of performing its individual function, as contemplated, without detrimental effect thereon by the other metal.

I claim:—

1. A composite metal comprising two outer facing layers of Britannia metal and an intermediate core layer of aluminum between said facing layers; the said outer layers directly adhering to said intermediate layers and being unalloyed therewith.

2. A composite metal comprising an intermediate core layer of aluminum, and two facing layers composed of from eighty-eight per cent. to ninety-six per cent. of tin, from four per cent. to nine per cent. of antimony, and from one per cent. to four per cent. of copper; the said outer layers directly adhering to said intermediate layer and being unalloyed therewith.

LEWIS B. TEBBETTS, 2d.

In the presence of—
A. J. McCauley,
E. B. Linn.